(12) United States Patent
Cox et al.

(10) Patent No.: US 7,469,950 B2
(45) Date of Patent: Dec. 30, 2008

(54) IMPACT BOOM NOISE REDUCING PANEL REINFORCEMENT

(75) Inventors: Jared Cox, Marysville, OH (US); Patrick Ellison, Tochigi (JP); Robb Augustine, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 11/679,469

(22) Filed: Feb. 27, 2007

(65) Prior Publication Data

US 2008/0203767 A1 Aug. 28, 2008

(51) Int. Cl.
*B62D 25/20* (2006.01)
(52) U.S. Cl. .................... 296/30; 296/204
(58) Field of Classification Search ............. 296/184.1, 296/204, 193.07, 193.08, 30, 37.2, 203.04
See application file for complete search history.

(56) References Cited

U.S. PATENT DOCUMENTS

| | | | | |
|---|---|---|---|---|
| 4,431,212 A | * | 2/1984 | Hirabayashi et al. | 280/762 |
| 5,018,780 A | * | 5/1991 | Yoshii et al. | 296/203.04 |
| 5,419,609 A | * | 5/1995 | Kmiec et al. | 296/187.11 |
| 5,472,259 A | * | 12/1995 | Akiyama et al. | 296/204 |
| 5,860,687 A | * | 1/1999 | Corporon et al. | 296/37.2 |
| 5,921,618 A | * | 7/1999 | Mori et al. | 296/187.12 |
| 6,053,566 A | * | 4/2000 | Aghssa et al. | 296/187.11 |
| 6,209,914 B1 | * | 4/2001 | Grieser et al. | 280/795 |
| 6,231,097 B1 | * | 5/2001 | Schell et al. | 296/37.2 |
| 6,672,639 B2 | * | 1/2004 | Kosuge et al. | 296/37.2 |
| 6,929,315 B2 | * | 8/2005 | Kim | 296/204 |
| 7,270,365 B2 | * | 9/2007 | Suzuki et al. | 296/187.08 |
| 7,364,225 B2 | * | 4/2008 | Tomioka | 296/203.04 |

FOREIGN PATENT DOCUMENTS

JP 10001073 1/1998

* cited by examiner

*Primary Examiner*—Joseph D Pape
(74) *Attorney, Agent, or Firm*—Rankin, Hill & Clark LLP; Mark E. Duell

(57) ABSTRACT

A structural support bracket for a rear cargo pan of a vehicle includes a forward end that is secured to a rear cross member and a rearward end that is secured to the rear cargo pan adjacent a center portion thereof so as to support the rear cargo pan against deflection during use. The forward end of the support bracket is secured to both a downwardly directed surface and a rearwardly directed surface of the rear cross member. The structural support bracket reduces deflection of the cargo pan and reduces generation of impact boom noises otherwise caused thereby.

13 Claims, 4 Drawing Sheets

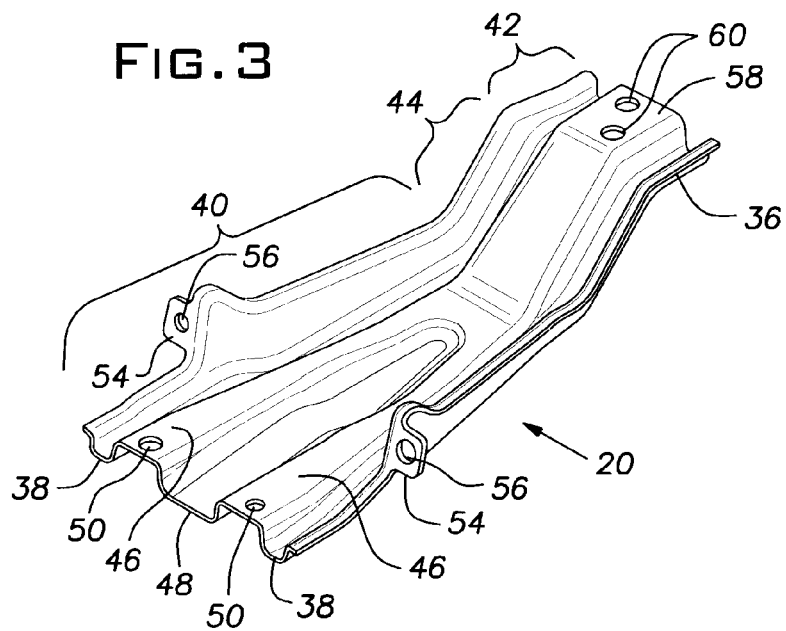
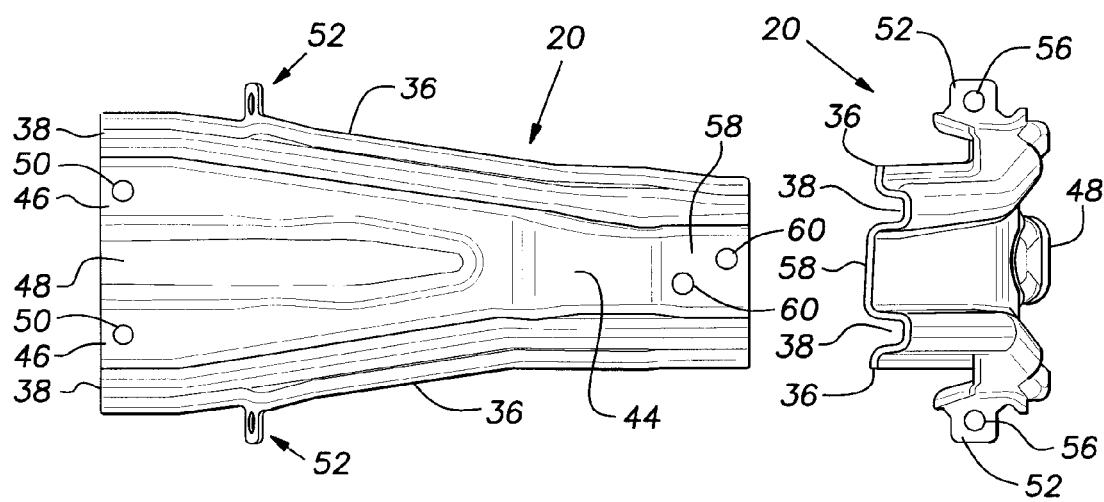

US 7,469,950 B2

IMPACT BOOM NOISE REDUCING PANEL REINFORCEMENT

BACKGROUND OF THE INVENTION

Field of the Invention

The present invention is generally directed toward support brackets and, more particularly, toward structural support or reinforcing brackets that serve to stiffen a vehicle body and floor and thereby reduce low frequency noise generation and subsequent transmission of low frequency noise to a vehicle.

DESCRIPTION OF RELATED ART

In some vehicles, such as passenger vans and sport utility vehicles, a noise is generated when the vehicle passes over small to medium imperfections in the road surface, such as bridge expansion joints. Such low frequency noise, which is typically at or around 40 Hz, produces an audible 'boom', which may be disturbing to the vehicle passengers.

In passenger vans and sport utility vehicles, a rear floor pan extends under the cargo compartment at the rear of the vehicle (i.e., behind the rear seats), from just forward of the rear bumper to about the rear cross member, which is normally generally above and slightly behind the rear axle. Accordingly, the rear floor pan is generally provided with few supports, and it is difficult to provide extra supports for the rear floor pan because of packaging constraints. For example, cargo space above the rear floor pan cannot be reduced. Further, space must be provided below the rear floor pan to receive the spare tire and the rear stabilizer bar. In this regard, it is known to provide spacer or mounting brackets against which the spare tire would rest, but such known spacer brackets are relatively thin (i.e., 1 mm) and do not have sufficient structural integrity to prevent deformation of the rear floor pan and, accordingly, cannot be considered structural supports for same. Further, it is known to provide a tire support mounting bracket beneath the rear floor pan that extends longitudinally along a centerline of the vehicle that serves as a mount from which depends the spare tire tether. Although such a tire support mounting bracket exists, it is only effective at supporting the spare tire, and does not provide significant reinforcement to the rear floor pan.

Unfortunately, the under-supported rear floor pan bows or flexes when small to medium imperfections are traversed by the vehicle, and generates disturbing low frequency noise that is transmitted to the passenger compartment. Accordingly, there exists a need in the art for a method and apparatus to better support the rear floor pan so as to reduce or minimize generation and transmission of such low frequency noise.

SUMMARY OF THE INVENTION

The present invention is directed toward a method and apparatus to prevent generation and transmission of low frequency noise due to bending or flexing of a vehicle rear floor pan.

More specifically, the present invention is directed toward a structural support bracket that extends between a rear cross member and a floor cargo pan of the vehicle so as to support the cargo pan against deflection during use of the vehicle. The structural support bracket includes a forward end that is secured to the rear cross member at a pair of angularly offset surfaces of the rear cross member, and a rearward end that is secured to the cargo pan adjacent a central portion thereof.

The structural support bracket forward end includes a pair of mounting surfaces that are secured to a downwardly directed surface of the rear cross member and cooperate to define a first plane. The structural support bracket rearward end includes a mounting surface that is secured to the cargo pan and defines a second plane, which is generally parallel to the first plane but vertically offset therefrom. The structural bracket forward end further includes a pair of laterally extending mounting tabs that are secured to a rearwardly directed surface of the rear cross member and cooperate to define a mounting plane that extends transverse to the first and second planes. Securing the structural support bracket to the rear cross member and the cargo pan about different planes and at different elevations helps to prevent twisting of the structural support bracket during use of the automobile, and securely supports the cargo pan against vertical deflection.

Use of the structural support bracket of the present invention prevents or minimizes deflection of the rear cargo pan during use of the vehicle, and reduces or eliminates generation of low frequency noise thereby.

BRIEF DESCRIPTION OF THE DRAWINGS

These and further features of the invention will be apparent with reference to the following description and drawings, wherein:

FIG. 3 is a top and front perspective view of a structural support bracket according to the present invention;

FIG. 4 is a top plan view of the bracket of FIG. 3;

FIG. 5 is a front end elevational view of the bracket of FIGS. 3-4; and, FIG. 6 is schematic cross-sectional view illustrating positioning of the spare tire relative to the structural support bracket and a pair of rear supporting brackets.

DETAILED DESCRIPTION OF THE PREFERRED EMBODIMENTS

Figure 1:
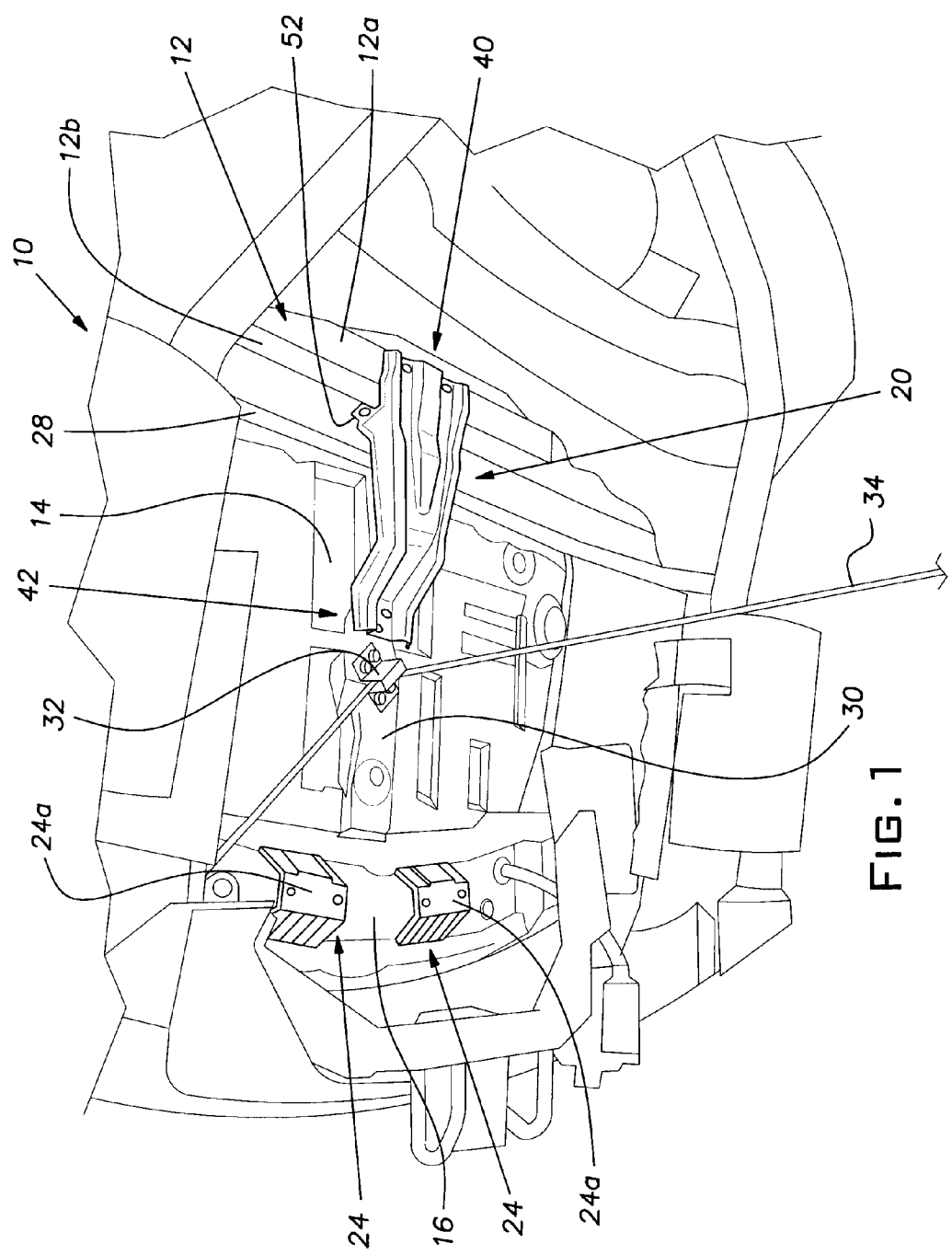
FIG. 1 is a perspective view of an underside of a vehicle, which is shown with a spare tire removed, incorporating the present invention.

With reference to FIG. 1, an underside of a rear portion of a vehicle 10 incorporating the structural support bracket of the present invention is illustrated. Although many components of the vehicle 10 are illustrated in the drawings, only those components that are relevant to understanding the placement and function of the structural support bracket 20 of the present invention will be discussed at length hereinafter.

As shown in FIG. 1, the relevant portion of the vehicle body or frame includes a rear cross member 12, a rear floor panel or cargo pan 14, and a rear end cross member 16. Generally, the rear cross member 12 is conventional and extends from side rails (not shown) that extend lengthwise along either side of the vehicle. The rear cross member 12 defines a generally U-shaped structure including a downwardly directed face 12a, a rearwardly directed face 12b, and a forwardly directed face (not shown). An upwardly open end of the rear cross member 12 is covered or closed by a floor of the vehicle, such as the rear cargo pan 14. Preferably, the downwardly directed face 12a of the rear cross member lies in a generally horizontal plan, while the rearwardly directed face 12b is generally vertically oriented, but may be at a slightly obtuse (i.e., greater than ninety degree) angle to the downwardly directed face 12a. The downwardly directed face 12a is disposed vertically below the rear cargo panel 14. Naturally, the present invention is not limited to any particular shape of the rear cross member 12, as one skilled in the art may adapt or modify the structural support bracket 20 to different mounting configurations. As such, the structural support bracket 20 described hereinafter is simply meant to illustrate the preferred embodiment of the present invention.

The rear cargo pan 14 defines a floor of the vehicle at a location disposed rearwardly of the rear seats. When viewed from the underside, the rear cargo pan 14 may define a well for receipt of a spare tire 26 (FIG. 2), although this is not mandatory. It will be appreciated that the rear cargo pan 14 may be somewhat enlarged, depending upon the length of the vehicle 10, and that a center of the rear cargo pan 14 is generally unsupported. As such, the rear cargo pan 14 is structurally supported only along the peripheral edge thereof.

Peripheral supports for the rear cargo pan 14 include the rear cross member 12, over which the rear cargo pan 14 may at least partially extend, the rear end cross member 16, and side rails (not shown), which conventionally extend along the length of the vehicle. Thus, it will be appreciated that, absent the structural support bracket 20 to be described hereinafter, the center of the rear cargo pan 14, which supports the stored spare tire 26 (FIG. 2), is generally unsupported. As such, in the past the rear cargo pan 14 has tended to flex when the vehicle encounters small or moderately sized road imperfections, resulting in an audible low frequency 'boom'.

Figure 2:
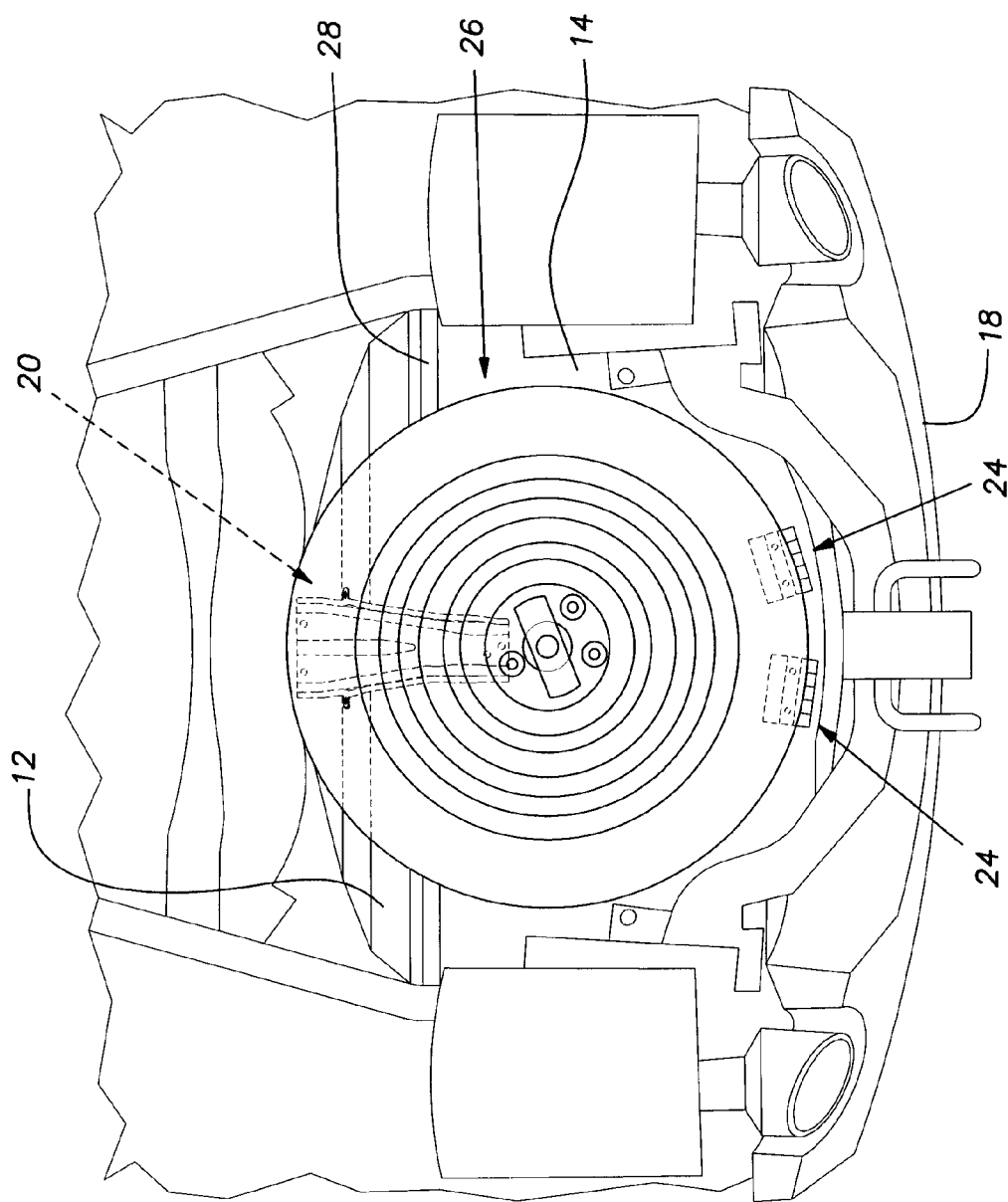
FIG. 2 is a bottom plan view of the vehicle underside, which is shown with the spare tire installed.

With continued reference to FIGS. 1-2, a pair of spacer brackets 24 are secured to the rear cross member 16. The spacer brackets 24 receive an upwardly directed surface of the spare tire 26 when the spare tire is in a storage position. The spacer brackets 24 are generally shaped as truncated triangles, with a downwardly facing flat or planar surface 24a that is engaged by the spare tire 26, generally adjacent the wheel or rim thereof.

The illustrated vehicle 10 includes a spare tire hanger mount assembly that includes a support panel 30, a support bracket 32, and a tether 34. The support panel 30 is secured to the rear cargo pan 14 and extends in a lengthwise direction thereof. The support bracket 32 is affixed to the support panel 30, and serves as a supporting mount for the tether 34. One end of the tether 34 is releasably secured to the spare tire 26 in a known manner, while the opposite end of the tether 34 is secured to a hoist mechanism (not shown) by means of which the length of the tether 34 can be adjusted to raise and lower the spare tire 26. As such, when the spare tire 26 is raised into the storage position, the weight of the spare tire is born by the support bracket 32 and, in turn, by the rear cargo pan 14.

In this regard it is noted that the support panel 30 primarily serves as a mounting location for the support bracket 32, and does not significantly reinforce the cargo pan 14. Moreover, due to the generally planar lengthwise extending orientation/configuration of the support panel 30, the support panel 30 is generally incapable of preventing deflection of the cargo pan 14. Therefore, in the following description the support panel 30 may be considered to be part of the cargo panel 14, and is hereinafter sometimes referred to as such.

Although not shown in detail, it will be appreciated that the rear cargo pan 14 may be stamped or roll-formed so as to integrally provide various surface features, such as one or more elongated ribs or channels. These surface features help to stiffen the rear cargo pan 14, and to provide mounting locations for various elements, such as wiring harnesses (not shown).

A rear stabilizer bar 28 extends widthwise across the vehicle 10, and is generally disposed at the intersection of the rear cargo pan 14 and the rearwardly facing surface 12b of the rear cross member 12. The rear stabilizer bar 28 is generally formed as an elongated cylindrical bar or tube and has bent ends (not shown) that are attached to associated components of the suspension. Such rear stabilizer bars 28 are considered to be well known in the art, and will not be described further hereinafter.

With reference to FIGS. 3-5, the structural support bracket 20 of the present invention is shown in detail. The structural support bracket 20 is preferably a formed (stamped) metal part having a pair of lengthwise extending edge flanges 36 and adjacent recesses or channels 38. The structural support bracket further defines a forward end 40, a rearward end 42, and a sloping portion 44 interconnecting the forward end 40 and the rearward end 42.

The forward end 40, in addition to the edge flanges 36 and the adjacent channels 38, is formed so as to define first and second upwardly facing planar mounting surfaces 46 that are separated by a central recessed portion 48. The first and second mounting surfaces 46 are separated from the associated edge flange 36 by the corresponding channel 38, as illustrated. As such, the forward end 40 is generally symmetrical about a centerline running through the central recessed portion 48.

The mounting surfaces 46 cooperate to define a first plane that is even with, or spaced slightly vertically above, the vertical elevation of the edge flanges 36. Accordingly, in some embodiments, when the structural support bracket 20 is secured to the rear cross member 12, the edge flanges 36 may engage the downwardly facing surface 12a of the rear cross member 12, or may be spaced slightly below the downwardly-directed surface 12a of the rear cross member 12. Each of the mounting surfaces 46 defines a hole 50 through which a mechanical fastener, such as a threaded screw, may be installed to mechanically secure the forward end 40 of the structural support bracket 20 to the downwardly directed surface 12a of the rear cross member 12.

The edge flanges 36 at the forward end are further formed so as to define a pair of mounting tabs or ears 52. Each of the mounting tabs 52 provides a forwardly directed engagement surface 54 and has a mounting hole 56 formed therein. The mount tabs' engagement surfaces 54 cooperate to define a plane extending transverse to the first plane defined by the forward end mounting surfaces 46. The mounting holes 56 permit mechanical fasteners to secure the mounting tabs 52 to the rearwardly directed (vertically extending) surface 12b of the rear cross member 12 such that the mounting tab engagement surfaces 54 are in face-to-face contact with the rear cross member rearwardly directed surface 12b.

The rearward end 42 of the support bracket 12 defines a central mount surface 58 that is aligned with the centerline of the structural support bracket and disposed relatively between the pair of channels 38 and the edge flanges 36. The central mount surface 58 defines a second plane that is generally parallel to the first plane, but is spaced vertically from the first plane, as will be apparent from the drawings. A pair of mounting apertures 60 are formed in the central mount surface 58, and permit the rearward end 42 of the structural support bracket 20 to be affixed to the cargo pan 14 via the tire support panel 30, as described further hereinafter.

It will be appreciated that the edge flanges 36, channels 38, and central recess 48 of the structural support bracket 20 greatly increase the structural support bracket's strength or resistance to bending in a direction perpendicular to the first and second planes. It will be further appreciated that mounting of the support bracket 20 to the rear cross member 12 at different surfaces 12a, 12b, which are essentially orthogonal to one another, greatly stiffens the connection between the support bracket 20 and the rear cross member 12 and serves to resist twisting of the support bracket during use. As such, the structural support bracket 20, when mounted to the rear cross member 12 and the cargo pan 14, helps to support the central portion of the rear cargo pan 14 and thereby eliminate or minimize deformation thereof. In tests conducted by the inventors it has been found that the structural support bracket 20 stiffens or supports the rear cargo pan to an extent that any impact 'boom' previously experienced when driving over minor road imperfections, such as bridge expansion joints, is eliminated or minimized to an extent that they are no longer objectionable to vehicle occupants.

When installed in the vehicle 10, the forward end 40 of the structural support bracket 20 is secured to the downwardly facing surface 12a and the rearwardly directed surface 12b of the rear cross member 12. The rearward end 42 of the structural support bracket is secured to the tire support panel 30 forwardly adjacent the downwardly extending tire support bracket 32. The structural support bracket 20 is spaced downwardly from the intersection of the rear cross member rearwardly directed surface 12b and the cargo panel 14 to provide sufficient clearance for the stabilizer bar 28, and does not interfere with the stabilizer bar 28 during use thereof.

Figure 6:
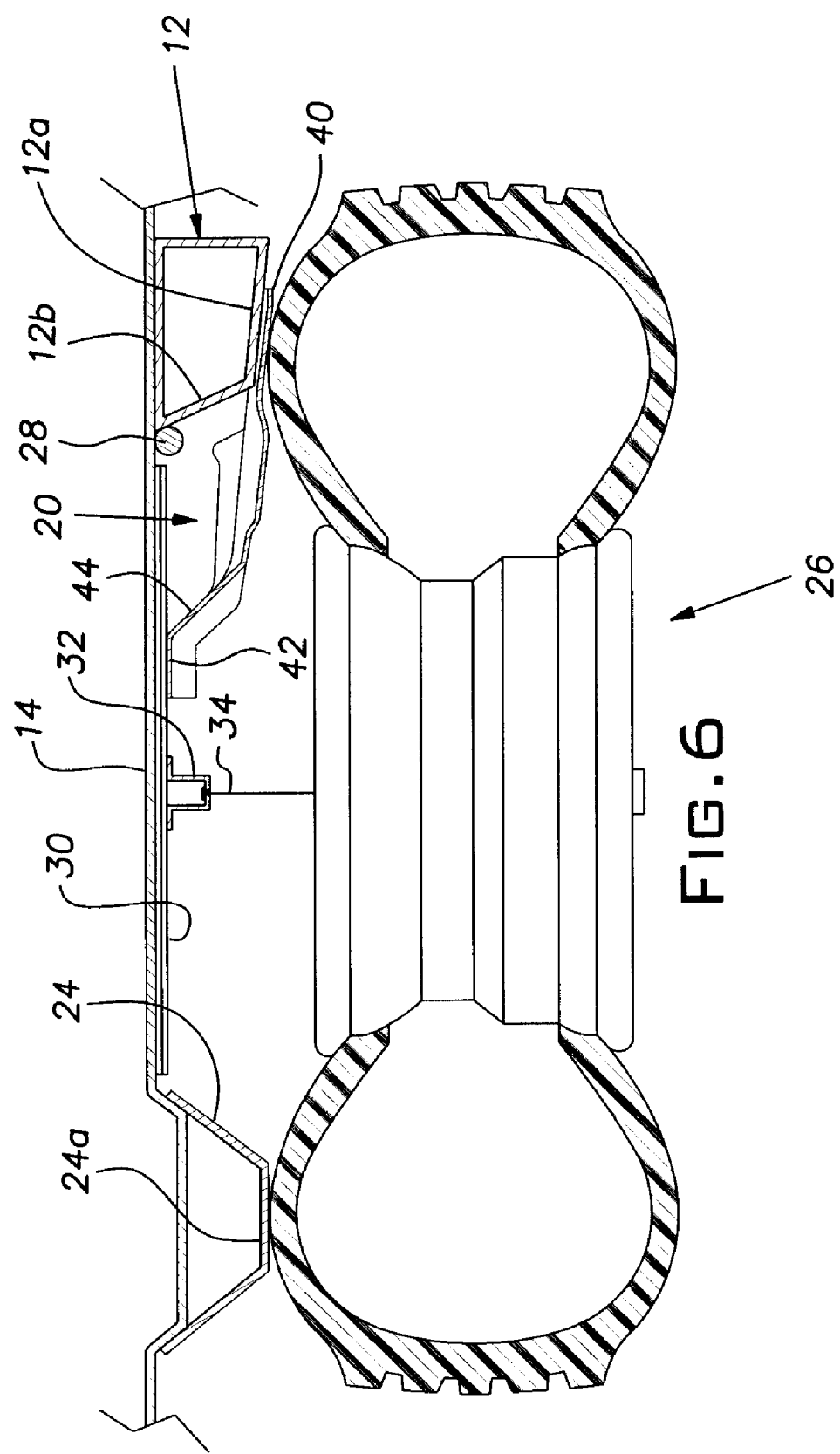

Further, the structural support bracket 20 cooperates with the spacer brackets 24 to provide a series of spaced apart surfaces against which the upwardly facing surface of the spare tire may rest or engage when the spare tire is in its stored position, as shown best in FIG. 6. More specifically, the upwardly facing surface of the spare tire 26 engages the spacer brackets 24 and the forward end 40 of the structural support bracket 20 (downwardly adjacent the rear cross member downwardly facing surface 12a).

While the present invention has been defined with specificity herein, the scope of the invention is not limited thereto. Rather, it is considered apparent that the present invention is capable of numerous modifications to accommodate placement of the structural support bracket into an associated vehicle, without departing from the scope and spirit of the present invention, as defined in the claims appended hereto. Accordingly, the foregoing detailed description is only provided to describe the presently preferred embodiments of the invention, and is not to be construed in a manner to limit the scope of the present invention, which is only defined by the following claims.

What is claimed is:

1. A floor supporting structure for a vehicle, comprising:
   a rear cross member, said rear cross member including a downwardly facing surface and a rearwardly facing surface;
   a rear end cross member, extending widthwise of the vehicle and adjacent a rear bumper of the vehicle;
   a cargo pan disposed between the rear cross member and the rear end cross member; and,
   a structural support bracket extending between the rear cross member and the cargo pan and adapted to support a center portion of the cargo pan against vertical deflection, said structural support bracket including a forward end and a rearward end, said forward end being secured to both the downwardly facing surface of the rear cross member and the rearwardly facing surface of the rear cross member, said rearward end being secured to the center portion of the cargo pan.

2. The floor supporting structure according to claim 1, wherein a stabilizer bar extends in a widthwise direction of the vehicle and traverses an area between the rear cross member and the center portion of the cargo pan, and wherein the structural support bracket extends below the stabilizer bar as the structural support bracket extends from the rear cross member to the center portion of the cargo pan.

3. The floor supporting structure according to claim 1, wherein the forward end of the structural support bracket includes a mounting surface that defines a first plane, and wherein the rearward end of the structural support bracket includes a mounting surface that defines a second plane, and wherein the first plane is parallel to but spaced vertically from the second plane.

4. The floor supporting structure according to claim 1, wherein the forward end of the structural support bracket includes a pair of mounting tabs that extend outwardly therefrom, each of said mounting tabs defining a forwardly facing engagement surface that cooperate to define a mounting plane, and wherein said mounting tabs are secured to the rearwardly facing surface of the rear cross member.

5. The floor supporting structure according to claim 3, wherein the forward end of the structural support bracket includes a pair of mounting tabs that extend outwardly therefrom, each of said mounting tabs defining a forwardly facing engagement surface that cooperate to define a mounting plane, and wherein said mounting tabs are secured to the rearwardly facing surface of the rear cross member.

6. The floor supporting structure according to claim 5, wherein the mounting plane is transverse to the first and second planes.

7. The floor supporting structure according to claim 6, wherein a stabilizer bar extends in a widthwise direction of the vehicle and traverses an area between the rear cross member and the center portion of the cargo pan, and wherein the structural support bracket extends below the stabilizer bar as the structural support bracket extends from the rear cross member to the center portion of the cargo pan.

8. A structural support bracket that is adapted to vertically support a rear cargo pan against deflection during use of an automobile, said structural support bracket comprising:
   a forward end defining a pair of mounting surfaces and a pair of mounting tabs, said mounting surfaces being adapted to be secured to a downwardly facing surface of a rear cross member of the vehicle, said mounting tabs being adapted to be secured to a rearwardly facing surface of the rear cross member, said mounting surfaces cooperating to define a first plane, said mounting tabs cooperating to define a mounting plane that is transverse to said first plane;
   a rearward end defining a surface that is adapted to be secured to the center portion of the rear cargo pan, said rearward end surface defining a second plane; and,
   a sloping portion interconnecting the forward end and the rearward end, wherein the second plane is generally parallel to, but vertically offset, from the first plane.

9. The structural support bracket according to claim 8, further comprising:
   a pair of edge flanges extending lengthwise of the support bracket;
   a pair of channels inset from the edge flanges; and
   wherein said mounting tabs are formed by said edge flanges.

10. The structural support bracket according to claim 9, wherein said forward end further comprises a central recessed portion that is disposed between said pair of mounting surfaces.

11. An improved floor supporting structure for a vehicle, comprising:
    a rear cross member, said rear cross member including a downwardly facing surface and a rearwardly facing surface;

a rear end cross member, extending widthwise of the vehicle and adjacent a rear bumper of the vehicle;

a cargo pan disposed between the rear cross member and the rear end cross member;

the improvement comprising:

a structural support bracket that is adapted to vertically support the rear cargo pan against deflection during use of an automobile, said structural support bracket comprising:

a forward end defining a pair of mounting surfaces and a pair of mounting tabs, said mounting surfaces being adapted to be secured to the downwardly facing surface of the rear cross member, said mounting tabs being adapted to be secured to the rearwardly facing surface of the rear cross member, said mounting surfaces cooperating to define a first plane, said mounting tabs cooperating to define a mounting plane that is transverse to said first plane;

a rearward end defining a surface that is adapted to be secured to the center portion of the rear cargo pan, said rearward end surface defining a second plane; and, a sloping portion interconnecting the forward end and the rearward end, and wherein the second plane is generally parallel to, but vertically offset, from the first plane.

12. The improved floor supporting structure according to claim 11, wherein the structural support bracket further comprises:

a pair of edge flanges extending lengthwise of the support bracket; and a pair of channels inset from the edge flanges;

wherein said mounting tabs are formed by said edge flanges.

13. The improved floor supporting structure according to claim 12, wherein the structural support bracket forward end further comprises a central recessed portion that is disposed between said pair of mounting surfaces.

* * * * *